Patented Feb. 13, 1934

1,947,248

UNITED STATES PATENT OFFICE 1,947,248

METHOD OF REGENERATING AND WASHING A ZEOLITE BED

Dana Burks, Jr., Urbana, Ill., assignor to Board of Trustees, University of Illinois, Urbana, Ill., a corporation of Illinois No Drawing. Original application June 19, 1930, Serial No. 462,401. Divided and this application June 13, 1931. Serial No. 544,288

2 Claims. (Cl. 210—24)

This invention relates to method of regenerating and washing a zeolite bed.

In my copending application, Serial No. 462,401, filed June 19, 1930, I disclose a method of chemically treating raw water containing dissolved salts to soften that water and thereby render it more adaptable for commercial use. The present application, which is a division of the above mentioned application relates more especially to the regenerating part of the cycle through which the zeolite bed is run during the practice of the invention. For the sake of clarity, however, the entire process will be briefly explained herein.

Raw water such as is commonly available for industrial use invariably contains appreciable amounts of dissolved salts, usually sodium carbonate, sodium chloride, or sodium sulphate, and the corresponding salts of calcium and magnesium. The presence of these salts in the water prevents the production of clear, marketable ice when standard manufacturing procedure is employed. As is well understood by those skilled in the art, with the utilization of freezing temperatures and freezing procedure commonly employed in artificial ice plants, whenever the concentration of salts dissolved in the solution to be frozen appreciably exceeds 500 parts per million, great difficulty is encountered in producing a clear, marketable product. The problem, therefore, resolves itself into the reduction of the concentration of the dissolved salts to such an extent (preferably to a concentration of less than 500 parts per million) that a suitable grade of ice may be produced when the operating procedure commonly employed in raw water ice plants is employed. The process, to be commercially successful, must be capable of being performed at a reasonable cost so that the cost of producing ice will not be made unduly high.

In the ordinary processes of treating water to soften it, the water is either passed through a complex sodium compound known as zeolite with the result that the magnesium or calcium ions in the solution which constitute its so-called hardness are exchanged for the sodium of the zeolite or is treated by means of lime or by means of soda ash followed by lime. The latter two methods reduce the hardness by removing the calcium and magnesium ions as insoluble calcium carbonate and magnesium hydroxide respectively. The three methods thus described are effective in removing the presence of calcium and magnesium ions. When the solution to be treated contains calcium or magnesium bicarbonates the application of lime results in a decrease in the total concentration of salts dissolved in the solution since calcium carbonate and magnesium hydroxide formed as a result of lime treatment are extremely less soluble than the corresponding bicarbonate. When either of the three methods are applied to solutions of sodium bicarbonate no reduction of total solids occurs due to the fact that the sodium carbonate thus formed is of the same order of solubility as the corresponding bicarbonate. If, however, the sodium ions of the sodium bicarbonate solution can be replaced by calcium or magnesium ion by means of exchange with calcium or magnesium zeolites subsequent lime treatment of the resulting solution would effect the desired decrease in dissolved salts.

The method of water treatment outlined in my above mentioned copending application modifies the usual process by first treating the zeolite material to convert it into magnesium zeolite which has the ability to exchange part of its magnesium for sodium ions existing in the sodium bicarbonate water to be subsequently treated. The water in passing through this magnesium zeolite gives up its sodium, forming magnesium bicarbonate therefor, and upon subsequent application of a lime treatment, this magnesium bicarbonate is converted into magnesium hydroxide and the lime to calcium carbonate, both of which are highly insoluble due to the fact that the solubility of lime is approximately 1700 parts per million while that of calcium carbonate is 16 and the solubility of magnesium bicarbonate 1400 parts per million while that of magnesium hydroxide may be reduced to less than 1 under proper conditions, the precipitation of magnesium hydroxide and calcium carbonate presenting possibilities of sufficient reduction in dissolved salts to render possible the production of clear ice from solutions containing high concentrations of sodium bicarbonate when standard ice manufacturing procedure is employed.

For convenience, all water sources may be classified according to their predominating sodium salt content. This holds even in case of those waters high in calcium and magnesium, because these constituents may either be removed in the form of their salt by the application of calcium hydroxide (common lime softening) or may be exchanged for sodium by means of either sodium carbonate (soda ash) or sodium zeolite. The three types of water to be encountered are, therefore, first, sodium bicarbonate or carbonate, second, sodium chloride, and third, sodium sulphate.

Solutions containing dissolved sodium salts are characterized by the fact that there are no known methods economically available whereby the total concentration of dissolved salt may be reduced. The reduction of total dissolved solids is of importance in the prevention of opaque ice formation as it has been demonstrated that by far the greatest factor in the production of opaque ice is the concentration of dissolved salts present in the solution undergoing freezing. A high concentration of dissolved salt results in an increased tendency to form an opaque shell and also in the existence of a large volume of unfrozen water at the point where the critical concentration regarding opaque ice formation is reached which must be removed. Some method whereby the initial concentration of dissolved sodium bicarbonate could be reduced would render available many water sources now worthless from the standpoint of raw water ice production.

The most effective chemical method available for the reduction of total solids in general water softening is that commonly designated as the lime treatment. This reaction depends upon the fact that whereas, for example, the solubility of magnesium bicarbonate and calcium hydroxide (lime) are 1400 and 1700 parts per million, respectively, the solubilities of magnesium hydroxide and calcium carbonate are 1 and 16 parts per million, respectively. Thus, when a solution of calcium hydroxide is added to a solution of magnesium bicarbonate, a reduction in total solids results because of the possibility which exists for the formation of two such extremely insoluble substances. The same results occur in the case of calcium bicarbonate in which case insoluble calcium carbonate is produced. When, however, calcium hydroxide is added to a solution containing sodium bicarbonate, sodium carbonate is formed which, being extremely soluble, results in no decrease in dissolved salts. Therefore, if the sodium in the sodium bicarbonate solution could in some way be replaced by magnesium, subsequent liming would result in the desired reduction of total solids.

There is one well established method of water treatment in which an exchange of ions is effected. Water containing calcium and magnesium which constitutes the so-called hardness, is passed through a bed of material commonly known as sodium zeolite. In passing through this material the magnesium and calcium ions in the water displace the sodium from the zeolite, thus being effectively removed from the solution as insoluble magnesium and calcium zeolite. Eventually the amount of exchange taking place renders the treatment ineffective.

At this point the amount of sodium available for exchange has become so reduced and the magnesium and calcium zeolites formed as the result of the exchange have so covered the effective surface of the exchange material that further efficient exchange is rendered impossible. To regain its former softening capacity, the sodium zeolite must be regenerated. This is accomplished in bypassing the water to be treated and washing the zeolitic with a concentrated solution of sodium chloride. At this point the course of exchange is reversed, the sodium now displacing the magnesium from the zeolite. The process, is therefore, cyclic, each cycle of exchange being followed by one of regeneration.

It is evident that the zeolite reaction, whatever its actual mechanism, is reversible, the direction in which the equilibrium is displaced depending upon the ratio of the concentrations of the reacting ions in the solution and the concentration of basic constituents in the solid zeolite. It remained to be determined whether the concentration of sodium ions existing in the naturally occurring sodium bicarbonate water would replace magnesium from a saturated magnesium zeolite. If effective exchange took place, the resulting magnesium bicarbonate could be effectively treated by means of lime, the resulting decrease in total solids depending upon the amount of sodium actually replaced by magnesium.

I have determined that sufficient exchange does take place in the concentration range involved to make the process commercially feasible.

Since treatment of sodium bicarbonate or carbonate solution with calcium zeolite would also result in an effluent water which could be effectively lime treated, this zeolitic material would appear to possess advantages over the use of the corresponding magnesium compound. It will be shown that the operational cost of the proposed method depends upon the amount of brine solution required to regenerate the zeolite. For this purpose calcium salts are less expensive than the corresponding magnesium compounds. It has been experimentally determined, however, that the use of calcium zeolite, although offering efficient exchange capacity, possesses fundamenal difficulties which are not inherent in the use of magnesium compounds. The reason is as follows.

In any aqueous solution of sodium carbonate or bicarbonate an equilibrium will become established between the ions which result from the dissociation of the various substances present. This equilibrium can be schematically represented as follows:—

(1) $Na_2CO_3 \rightleftharpoons 2Na^+ + CO_3^=$ (2) $2H_2O \rightleftharpoons 2OH^- + 2H^+$ (3) $2H^+ + CO_3^= \rightleftharpoons H_2CO_3 \rightleftharpoons H_2O \quad CO_2 \rightleftharpoons CO_2$
$\qquad\qquad\qquad\qquad\qquad\qquad\qquad\text{(dissolved)} \quad \text{(gas)}$ (4) $H_2CO_3 \rightleftharpoons H^+ + HCO_3$ (5) $HCO_3^- \rightleftharpoons H^+ + CO_3^=$ An equation can be established showing that under any given set of external conditions the concentration of each of the individual constituents of the solution is fixed. Thus, in any so-called sodium bicarbonate solution there will always exist a certain concentration of $CO_3^=$ ion, the amount of which in turn depends upon the alkalinity or pH of the solution.

When, therefore, use is made of calcium zeolite any calcium ions formed as a result of exchange will find themselves in equilibrium with a definite concentration of carbonate ion ($CO_3^=$). If the concentration of carbonate ion is sufficiently high, insoluble calcium carbonate will precipitate. The degree of alkalinity most favorable for this precipitation is that designated as a pH of 7 or above. Therefore, at the pH of the normally occurring sodium bicarbonate water (8 or above) calcium carbonate is unstable. The precipitation of this extremely insoluble material on the surface of the zeolite, will eventually clog the exchange material and render it inactive.

In recognition of this problem, various attempts have been made heretofore, of which I am aware, to reduce the pH of the solution of calcium zeolite to a point below 7. This has been accomplished by decreasing the alkalinity of the solution by means of dissolved $CO_2$ gas. This, as can be seen from the equilibrium equation shown above, increases the ratio of $$\frac{(CO_2)}{(HCO_3)}$$

and in turn decreases the alkalinity to a point below a pH of 7 at which no precipitation of calcium carbonate will occur. The difficulty with this procedure rests in the fact that, as the alkalinity decreases and the hydrogen ion concentration correspondingly increases, the preponderance of the exchange is no longer between sodium and calcium but rather between hydrogen ion and calcium. Such action renders the reaction worthless for the purpose involved.

In the case of magnesium zeolite no such difficulty exists. The only insoluble compound of magnesium which can form as a result of exchange with aqueous solutions of sodium bicarbonate is magnesium hydroxide. Magnesium hydroxide in the concentration ranges involved does not precipitate under a pH of 9.5, a point rarely, if ever, reached in the case of naturally occurring waters.

The actual operation of the method of my invention consists of three cycles after magnesium zeolite is formed or four cycles beginning with the commercial sodium zeolite available for such purpose. The first step in this process consists in a conversion cycle, during which the sodium zeolite is treated with a concentrated magnesium chloride brine (3%) with the result that magnesium zeolite is formed, the magnesium displacing from the zeolite sodium which it originally contained.

With the magnesium zeolite thus formed, the water treatment is carried on in three cycles. The first of which, the exchange cycle, includes forcing the sodium bicarbonate water through a bed of magnesium zeolite, the sodium ion of the solution being exchanged for the magnesium ions of the zeolite, so that the zeolite again becomes sodium zeolite and the solution becomes a solution of magnesium bicarbonate. This exchange cycle is continued until the magnesium zeolite has lost so much of its magnesium as to be incapable of further efficient exchange at which time the second or regenerating cycle is performed. In this cycle, the zeolite now existing largely as sodium zeolite, is again treated with a concentrated magnesium chloride brine to reconvert it into a magnesium zeolite. It will be observed that the regenerating cycle is in reality a repetition of the converting cycle first performed. After the regenerating cycle has been continued sufficiently long to remove as much of the sodium from the zeolite as is possible and to replace it with magnesium, the third or washing cycle is performed. During this washing cycle, any excess of magnesium chloride brine held in the interstices of the zeolite bed as a result of the regenerating cycle, is displaced. The water used in the washing process is the same as that subsequently used in the exchange reaction. The washing and exchange cycles actually overlap, since some exchange is actually taking place during part or all of the washing cycle. The washing cycle formally ends when the last trace of unbound magnesium chloride has been removed and the concentration of magnesium in the effluent solution is that resulting from exchange alone.

Any of the apparatus designed and developed in the case of zeolite water softening can be effectively utilized in the magnesium zeolite treatment of my invention. All of the zeolitic exchange materials on the market for commercial water softening have been found to be applicable to my method. Certain types of exchange zeolites have, however, been found to be more efficient, notably those prepared synthetically by mutual precipitation of sodium silicate and some aluminum silicate. These types of exchange zeolites are commercially manufactured and available upon the open market.

In the regenerating cycle any soluble magnesium salt is effective in the preparation of the regenerating brine solution. Because of its low price, commercial flake magnesium chloride has been extensively used. The same concentration of regenerating brine used in the case of commercial zeolite water softening has also been found to be effective in the case of magnesium zeolite regeneration. Either upward or downward flow during either or all of the cyclic operational steps has proven to be equally effective. The same precaution holds in the use of magnesium zeolite, however, that have been established in the commercial zeolite operation for water softening.

Because the regenerating salt, magnesium chloride, is more expensive than the sodium chloride used in the case of water softening, and because the efficiency of exchange between magnesium zeolite and sodium ion is not as great as that existing between the corresponding sodium zeolite and an equivalent concentration of magnesium ion, the following procedure has been adapted in the regenerating and washing cycles. During the regenerating cycle, only the first quantity of brine passing through the zeolite bed is discarded, the subsequent portions of the brine being saved to be used as the first portion to be passed through the zeolite column during the next regenerating cycle. Obviously, the greatest amount of regeneration is accomplished by the first portion of brine passing through the zeolite. The concentration of sodium in the zeolite is high at this time and the resultant exchange between the magnesium of the regenerating brine and the sodium in the zeolite is consequently high. Therefore in the brine which first passes through the zeolite the concentration of exchangeable magnesium is greatly depleted. After this first efficient exchange has taken place, however, the brine which subsequently passes through the zeolite does not give up as much of its magnesium with the result that after it has completely passed through the zeolite bed, it still contains an appreciable quantity of exchangeable magnesium and therefore still possesses potential regenerating capacity when applied under more favorable conditions. This latter brine is therefore saved to be employed as a first portion of regenerating solution to be used in a subsequent regenerating cycle. In this case it is brought in contact with zeolitic material resulting from a complete exchange cycle and wherein the concentration of replaceable sodium is at a maximum. At the end of each regeneration cycle an amount of fresh brine equal in amount to that discarded, is drawn from a supply reservoir and passed through the zeolite. The actual amount of brine consumed in each regeneration cycle is therefore represented only by that amount of solution which passes through the zeolite and is discarded.

In practice it has been determined that the first third of the regeneration brine used should be discarded while the subsequent two thirds should be saved for the next regenerating cycle. The regenerating cycle is completed by the passage of a volume of fresh brine equal to that discarded. While these relative volumes of solution have been found to hold in actual practical operation, my claims should in no way be held to these values alone.

Generally, in the washing cycle, because of the large amount of magnesium brine in the interstices of the zeolite, the first water passing through the zeolite will contain a large amount of exchangeable magnesium. As the washing continues, the concentration of unbound magnesium chloride in the water decreases due to dilution until it reaches that concentration present in the raw water, at which time the washing cycle is complete and the exchange cycle has started.

Since the water that first passes through the zeolite in the washing cycle contains an appreciable concentration of exchangeable magnesium it is preserved and employed in the formation of new regenerating brine. Because of the preponderance of magnesium in the wash water during the first period of the washing cycle, a relatively small amount of exchange can take place and the sodium concentration of the solution is therefore not greatly higher than that of the raw water. By employing this water to dissolve the magnesium chloride required in the formation of magnesium brine, the available magnesium chloride in the wash water is thereby utilized. The transition from the washing cycle to the exchange cycle is made as soon as all of the magnesium chloride resulting from the regenerating brine has been removed. In carrying out this process, the washing is done with the water traveling through the zeolite at a higher rate than that maintained during the exchange cycle, and the transition from the one cycle to the other consists merely in reducing the velocity of the water. The exchange cycle is stopped whenever a desired average magnesium ion concentration results in the treated water. If a large reduction in total solids is desired the final concentration of magnesium must be correspondingly high. In fact, the resulting concentration of magnesium must be practically equivalent to the concentration of sodium bicarbonate to be removed. It has been determined in some cases of ice plant procedure, for example, that it is unnecessary to decrease the dissolved salt by an amount equivalent to all of the sodium bicarbonate present. In such cases, the average concentration of magnesium ion resulting from exchange will determine the final reduction in total solids to be effected.

After the water has passed through the zeolite in the exchange cycle, it is collected in a suitable tank and given a liming treatment in the usual manner.

In the practice of my invention close chemical supervision of the operations is not necessary. In the zeolitic treatment, for example, the exchange cycle may well be governed by the quantity of water passed through the bed, particularly where the composition of the raw water is constant, as it is in most instances. The zeolite bed will be depleted in exchangeable magnesium to a definite degree after a certain amount of water has passed through the bed, and the quantity of water, once determined can be utilized to accurately mark the end of the cycle. Furthermore, the regenerating cycle can likewise be regulated by the quantity of brine passed through the bed and the washing cycle by the quantity of water passed through it, so that the entire process can be accurately manipulated without resorting to continuous chemical tests. This procedure is successfully followed in commercial water softening installations now in general use, and can be practiced with equal success in the methods of my invention.

While the process herein described is concerned primarily with the reduction of total solids in the case of sodium bicarbonate and carbonate solutions by means of magnesium zeolite, it is obviously applicable to the reduction of total solids in the case of solutions of all alkali metal bicarbonates and carbonates. Thus, potassium bicarbonate likewise may be removed although the occasion for this arises seldom since potassium bicarbonate is not ordinarily found in appreciable quantities in the supply of water. Barium and Strontium zeolites may also be used in the place of magnesium zeolite.

In the practice of the process of my invention, because of the materials employed and the methods used in handling these materials, the cost of treating the water to render it suitable for commercial use is small. The assurance that the ice made will be clear and marketable offsets the cost of treating the water by entirely reducing or at least substantially minimizing the number of cakes of unmarketable ice made in the operation of the plant.

Having thus described my invention, what I consider new and desire to have protected by Letters Patent is pointed out in the appended claims:

1. A water treating system operating in a cycle of three stages comprising an exchange stage wherein water is caused to flow through a zeolite bed to effect an exchange of the salts in the water for the salts in the bed, a regenerating stage wherein a brine solution is passed through the bed to regenerate the bed, and a washing stage wherein water is passed through the bed in the same direction as during the exchange stage but at a faster rate, the regenerating brine comprising approximately the last two thirds of the effluent of a previous regenerating stage and the first part of the effluent of a previous washing stage, said parts being mixed together and concentrated by the addition of regenerating salt, the shift from the washing stage to a following exchange stage being effected by reducing the rate of flow of water through the zeolite bed.

2. A water treating system for treating water containing sodium chloride, said system operating in a cycle of three stages comprising an exchange stage wherein water containing the sodium chloride is caused to flow through a magnesium zeolite bed to effect an exchange of the sodium salt in the water for the magnesium salt in the bed, a regenerating stage wherein a magnesium brine solution is passed through the bed to regenerate the bed, and a washing stage wherein water containing sodium chloride is passed through the bed in the same direction as during the exchange stage but at a faster rate, the regenerating brine comprising approximately the last two thirds of the effluent of a previous regenerating stage and the first part of the effluent of a previous washing stage, said parts being mixed together and concentrated by the addition of magnesium salt, the shift from the washing stage to a following exchange stage being effected by reducing the rate of flow of water through the zeolite bed.

DANA BURKS, Jr.